United States Patent [19]

Harden

[11] Patent Number: 4,524,837
[45] Date of Patent: Jun. 25, 1985

[54] SOIL CONDITIONING AND BED PREPARATION APPARATUS

[75] Inventor: Jerrell W. Harden, Banks, Ala.

[73] Assignee: Allied Products Corporation, Chicago, Ill.

[21] Appl. No.: 366,281

[22] Filed: Apr. 7, 1982

[51] Int. Cl.³ .................. A01B 13/08; A01B 49/02
[52] U.S. Cl. .................. 172/156; 172/196; 172/551
[58] Field of Search ............ 172/196, 156, 146, 151, 172/699, 459, 551, 572, 166, 177, 185, 550, 600, 603, 573

[56] References Cited

U.S. PATENT DOCUMENTS

| | | |
|---|---|---|
| 2,357,916 | 9/1944 | Strandlund . |
| 2,529,417 | 11/1950 | Pitre . |
| 2,577,363 | 12/1951 | Poyner . |
| 2,734,439 | 2/1956 | Padrick ........................ 172/196 |
| 2,787,202 | 4/1957 | Gladis . |
| 2,849,969 | 9/1958 | Taylor . |
| 3,042,118 | 7/1962 | Norris . |
| 3,122,111 | 2/1964 | Taylor, Sr. . |
| 3,170,421 | 2/1965 | Norris et al. . |
| 3,175,522 | 3/1965 | Garber et al. . |
| 3,202,222 | 8/1965 | Norris . |
| 3,220,370 | 11/1965 | Smith . |
| 3,319,589 | 5/1967 | Moran . |
| 3,362,361 | 1/1968 | Morrison, Jr. . |
| 3,452,826 | 7/1969 | Lehman . |
| 3,701,327 | 10/1972 | Krumholz . |
| 4,004,640 | 1/1977 | Bland . |
| 4,055,126 | 10/1977 | Brown et al. . |
| 4,187,916 | 2/1980 | Harden et al. . |
| 4,213,408 | 7/1980 | West ........................... 172/196 |
| 4,230,054 | 10/1980 | Hatcher ........................ 172/133 |
| 4,241,674 | 12/1980 | Mellinger ...................... 172/196 |
| 4,267,783 | 5/1981 | Hendrix ........................ 172/196 |

FOREIGN PATENT DOCUMENTS

817658 10/1951 Fed. Rep. of Germany .

Primary Examiner—Richard J. Johnson
Attorney, Agent, or Firm—Saidman, Sterne, Kessler & Goldstein

[57] ABSTRACT

Soil conditioning apparatus having a main frame, and means coupled to the main frame for cutting and loosening compacted soil to prepare a seed bed and rooting environment, including a subsoiler coupled to the main frame and angled to be pulled downwardly into the earth below the surface to prepare a better rooting environment and seed bed and to increase water infiltration. A slot filler wheel is coupled to the main frame for filling voids in the soil left by the forward motion of the subsoiler therethrough; the slot filler wheel is mounted adjacent to and laterally spaced from the subsoiler so that a portion of the slot filler wheel may extend forwardly of the trailing face of the subsoiler. Also, the slot filler wheel may be mounted to lie in a plane of rotation which extends downwardly toward the subsoiler and inwardly toward the slot formed behind the subsoiler. One or more rotatable seed bed implements may be mounted alongside the subsoiler to contain soil displaced by the subsoiler within a defined bed region.

17 Claims, 7 Drawing Figures

SOIL CONDITIONING AND BED PREPARATION APPARATUS

BACKGROUND OF THE INVENTION

1. Field of the Invention

This invention relates to farming equipment, and more particularly, to an improved apparatus for preparing a seed bed and rooting environment prior to planting.

2. Description of the Related Art

This invention is an improvement over known soil conditioning apparatus, including that described in U.S. Pat. No. 4,055,126, issued 27, Oct. 1977 to Jerrell Harden and Ronald Brown, and in U.S. Pat. No. 4,187,916, issued 12, Feb. 1980 to Jerrell W. Harden and William P. Brown. Hereinafter for convenience, the devices described in the aforementioned Brown et al '126 and Harden et al '916 patents are called collectively the "Harden-Brown soil conditioning apparatus".

Farmland that has been cultivated (plowed) or had any traffic on it will form a compacted layer at or beneath the surface. This compacted layer of soil is called a "plow pan" or "hard pan" or surface compaction. The naturally occurring "hard pan" or man-made "plow-pan" is usually about ½ to 4 inches thick and may be located about 6 to 20 inches beneath the surface, while surface compaction is in the top 8 inches. There are two main factors that contribute to the development of a compacted layer. One is the weight of the implements used to till the soil. The other is the weight of the tractor creating forces acting through the wheels. As the tractor moves across the field, "traffic pans" are created under the tractor wheels. As the "traffic pans" are tilled, they move further down until they reach a depth where it becomes difficult for a plow to disturb them. When soil is loose, one pass across it with a farm tractor will produce 60 to 80 percent of maximum soil compaction. Thereafter, all successive passes can compact it only 20 to 40 percent tighter.

The majority of cultivated land in this country does not necessarily require deep plow subsoiling to break up the subsurface hard pan. Much of the soil can be cultivated to a depth of about 4 to 8 inches; this will be sufficient to promote effective root growth. No previously available no-till planters have the capability to plow or loosen up this surface 4 to 8 inches in the row middles. Consequently, lateral root growth is either mildly or greatly restricted depending on soil type. This surface compaction also slows the rate of water infiltration into the soil, thereby increasing water runoff, and carrying with it topsoil, nutrients, and pesticides. This results in increased pollution of our streams. Since fertilizer and pesticides are applied and remain on the soil surface in no-till crops, this water runoff becomes a serious problem by increasing pollution of our streams.

In about 15 to 20 percent of cultivated land in this country, the man made plow pan severely restricts plant growth. If it is compacted tightly enough, roots cannot penetrate it; therefore plant growth and yields are greatly restricted. The density of compaction is determined by the soil type. With no "hard pan" or other restrictions, a plant's roots can grow to a depth of 6 feet and a width of 4 feet within about 45 days after seed germination. However, when the compacted layer is such that roots cannot penetrate it, the plant must obtain all its nutrients and moisture from the earth above the compacted layer. Therefore, it must receive rain at frequent intervals in order to survive. But it can survive for a longer dry period if it is feeding off 6 feet of earth instead of only the 6 to 14 inches of soil above the compacted layer.

Numerous systems have been devised in an effort to overcome the inability of plants to penetrate the compacted layer, to generally prepare better seed beds, more and better rooting in the soil and to increase water infiltration, in order to thereby increase crop yield, to better preserve natural resources, such as top soil and the moisture content in the soil, and to lessen pollution of streams and the like. Relatively recent examples of such prior systems are found in Norris et al U.S. Pat. No. 3,170,421, issued 23, Feb. 1965, and Krumholz U.S. Pat. No. 3,701,327, issued 31, Oct. 1972.

The development of the Harden-Brown soil conditioning apparatus for the first time permitted a single apparatus to accomplish in one operation all of the results which had previously required multiple steps and/or machines. Specifically, in a single pass under no-till conditions (that is, the winter cover crop or the previous year's crop residue having been left in the field, being generally known in the agricultural industry as "trash" or "mulch"), the Harden-Brown soil conditioning apparatus has been able to cut through mulch in the area to be prepared as a seed bed, break up the compacted layer beneath the anticipated seed bed, fill the trench left by the subsoiler when breaking up the compacted layer with the broken up soil, fertilize and apply pesticides to the seed bed area, and work the soil to prepare the seed bed for planting.

Details of the construction and operation of an earlier improved Harden-Brown soil conditioning apparatus are set forth in above-mentioned U.S. Pat. No. 4,187,916, the disclosure of which is incorporated herein in its entirety by reference as though set forth in full hereafter.

The present invention accomplishes substantially better results with greater efficiency than did the older Harden-Brown apparatus. An important difference between the present invention and the older Harden-Brown apparatus lies in the location of the slot filler wheel. In known conventional devices, of the type described, for example, in the above-noted Brown et al '126 patent and Harden et al '916 patent, a slot filler member was located behind and in longitudinal alignment with the subsoiler. In conventional apparatus of this type, a presistent problem occurs in that in wet soils of many soil types, soil will stick or adhere to the slot filler member. This occurs because the slot filler member is running in soil that has been loosened by the subsoiler member. In this loosened soil condition, there is nothing to prevent soil from sticking or adhering to the slot filler member. The arrangement of the present invention solves and eliminates this problem by the placement of the slot filler member to one side of the subsoiler member. By this arrangment the slot filler member will run in firmer soil. As is common knowledge in the agricultural industry, less soil will adhere or stick to implements in soil that has not been tilled compared to soil that has been tilled. The arrangement of the present invention constitutes a significant improvement over known soil conditioning apparatus.

The novel relationship between the subsoiler and slot filler means discovered by the present inventor and incorporated into the soil conditioning apparatus described hereunder has produced unexpected advantages having far-reaching significance and application to all types of soil conditioning. An important feature of this invention resides in the manner in which the slot filler assembly and subsoiler assembly are mounted relative to each other and to the main frame or tool bar. Due to its angled configuration, the subsoiler is pulled downwardly into the earth as the entire apparatus is pulled forwardly by the tractor. The depth of penetration is controlled by the location of the tractor lift or, more commonly, by depth gauge wheels mounted to the tool bar. The slot filler assembly is mounted to the tool bar for independent movement relative to the subsoiler in a generally vertical plane. The slot filler assembly is biased in the downward direction; the downward biasing force combines with the downward pulling force of the subsoiler to pull the slot filler member into the soil beside the subsoiler-created slot, resulting in a better slot filling action, and preparation of a better seed bed and rooting environment. The present inventor has also discovered that the overlapping relationship of the slot filler member to the subsoiler, particularly when the slot filler member is also tilted downwardly toward the subsoiler, and/or angled inwardly toward the slot formed by the subsoiler, does a better job of filling the subsoil slot and results in the preparation of a better seed bed and rooting environment compared to known apparatus.

Another important feature which differentiates the present invention from the Harden-Brown and other prior art devices resides in the location of the bed preparation implements. One or more rotatable bed preparation implements are mounted to the tool bar and extend downwardly alongside the subsoiler to prepare a wider root bed in the top 6 inches of soil adjacent the seed bed prepared by the subsoiler and slot filler than was heretofore possible with known devices.

This wider root bed, which can be up to 36 inches wide per row, is created by the coulters working, disturbing, or tilling the surface or topsoil up to 6 inches deep in a no-till environment. The slot filler member and bed preparation implements work, disturb, or till the soil but do not incorporate the mulch, trash, or crop residue which is on top of the soil surface. This root bed, i.e., loosened soil with mulch on top, is an ideal rooting environment.

This loosened soil with a mulch on top has another important advantage, that of increased water infiltration. Research has shown that a mulch on the soil surface slows the movement of water, thereby allowing a longer period of time for water to percolate or infiltrate down into the soil. Research also shows that soil which has been loosened by plowing without subsequent tillage which will recompact; i.e., bottom or chisel plowing without disking, etc., will have a much faster percolation or infiltration rate than will the same soil after later tillage has recompacted it. This loosened soil will also hold a much greater amount of water per foot of soil than the same soil after later tillage has recompacted it. This increased capacity of the soil to retain more of the rainfall and store it in the soil for future crop use can produce a dramatic increase in crop yield in a crop year that has one or more rains with runoff followed by short periods of drought. In such cases, the extra water stored in the soil is often enough to keep the crop growing until the next rain.

Another unique feature of the present invention is the ability of the implement to clear away up to 100% of the trash from a 4 to 8 inch wide band in the middle of the seedbed. This trash free band where seed is deposited greatly increases the chances of good stand for four reasons. First, the trash free band allows a more uniform placement or depth of seed in the soil. Secondly, the less trash in this band where seed is planted enhances seed to soil contact. Third, trash in the seedbed area causes seedling diseases and increases the chance of insect damage. Fourth, less trash is partially incorporated in the seedbed. Trash sticking out of the soil acts like a wick in drying the soil out. This is a major problem with in-row sub-soil no-till planters that are presently available.

The present invention accomplishes this trash free band for a seedbed by the parabolic design of the subsoil shank and the relationship of the slot filler and seedbed preparation members to the subsoil shank. The more parabolic a subsoil shank, the more the surface soil tends to roll out to the side of the subsoil shank. As this surface soil rolls out to the side, it throws the mulch or crop residue out of the seedbed area. This is a disadvantage with all presently available no-till planters which have no way of moving soil back into the seedbed area. If no soil is moved back into the seedbed area, then the seed is planted in a furrow or depressed area. Practically all crops need to be planted level or on a raised seedbed. The slot filler and seedbed preparation members of the present invention move or push soil back into the seedbed area. Adjustments on the slot filler and seedbed preparation members determine how much soil is moved back into the seedbed area to allow planting on a level seedbed or on a raised seedbed up to 8 inches high. This ability to build and plant on a raised seedbed is another unique feature of the present invention.

Still further, the present invention is significantly more compact than the older Harden-Brown apparatus, thus enabling a tractor to lift the unit more easily. This shorter length has other advantages, particularly when a planter is trailed behind; in such case, the entire length of the combined bed preparation apparatus and planter is substantially less than the older type systems, whereby the combination is more maneuverable and the planter tracks around a curve better, to follow the bed and plant the seed in the center of the bed when following around a curve.

SUMMARY OF THE INVENTION

This invention comprises an apparatus having a main frame and improved soil conditioning means for loosening and conditioning soil, preferably behind a trash-cutting implement also mounted to the main frame. The improved soil conditioning means includes a subsoiler assembly composed of a subsoiler having a blade portion and a shank portion; the shank portion is secured to the main frame such that the subsoiler extends downwardly from the main frame behind the trash-cutting implement at an angle so that the blade portion may be pulled downwardly into the earth below the surface to form a slot or groove in the soil in which roots can grow. The improved soil conditioning means further includes a slot filler assembly coupled to the main frame for filling voids in the soil left by the subsoiler; the slot filler assembly includes a rotatable member which is mounted beside and at least partly behind the subsoiler. Advantageously, the rotatable slot filler member may be mounted to lie in a plane of rotation which is angled downwardly toward the subsoiler and inwardly toward the slot formed behind the subsoiler.

The improved soil conditioning means may also include one or more rotatable seed bed implements mounted to the main frame and spring loaded for rotation on one or both sides of the path of travel of the subsoiler.

Preferably and advantageously, the rotatable slot filler member is composed of a fluted coulter having a diameter which is greater than about 17 inches. Adjustable mounting means adjustably mount the slot filler wheel to a slot filler support arm which in turn is coupled to the main frame for pivotal movement relative thereto. Adjustable spring means are coupled to the slot filler support arm for exerting an adjustable force against the support arm and slot filler wheel. The seed bed implement also preferably comprises a fluted coulter having a diameter of less than about 22 inches.

Preferably, the slot filler wheel is laterally spaced from the subsoiler shank a distance of at least about 3 inches; and the slot filler wheel and seed bed implement are spaced from each other a distance of at least about 4 inches.

At least one additional fluted coulter may be mounted for rotation coaxially with the slot filler wheel and spaced laterally outwardly of the slot filler wheel relative to the subsoiler path of travel.

Other features and advantages of the present invention will become apparent from the detailed description set forth below.

DESCRIPTION OF THE PREFERRED EMBODIMENTS

The soil conditioning and bed preparation apparatus of this invention comprises a main frame or tool bar 10 to which may be mounted one or more subsoiler assemblies, slot filler assemblies and seed bed preparation assemblies. Preferably, and advantageously, one or more trash-cutting front coulter assemblies may also be mounted to the tool bar 10 ahead of the subsoiler assemblies. Each of the above described assemblies extends downward of the tool bar to contact and/or pierce the top soil and/or subsoil when the apparatus is in its operative position and is pulled by a tractor. The tool bar and above described assemblies may be coupled to a tractor by means known to persons skilled in the pertinent art; one such mechanism is described in the aforementioned Harden et al '916 patent.

Preferably and advantageously, a number of sets of front coulter, subsoiler, slot filler and seed bed preparation assemblies are mounted to the tool bar; each such set constitutes one "row". Generally anywhere from about two to twelve rows may be mounted to the tool bar. The present description is made with reference to one such row, it being understood that each additional row is substantially the same.

As in known devices of this type, the trash-cutting assembly generally includes a front coulter 12 which is designed and intended to prepare a generally trash free path ahead of the subsoiler shank so that little or no trash collects in front of the subsoiler to hinder its operation. A preferred mounting arrangement for front coulter 12 is described in the Harden et al '916 patent.

The subsoiler assembly includes a slot (or groove) forming means 14, generally referred to herein as a subsoiler 14. Preferably and advantageously, the subsoiler 14 has a parabolic shape of a type well known in the industry. The subsoiler penetrates the soil to form a slot or groove into which roots may grow. For general no-till planting operations, the subsoiler may be arranged to form a slot about 4 to 8 inches deep, much like the action of a chisel plow. In soil conditions where it is necessary to break up the compacted layer, the subsoiler may penetrate the soil to an average depth of about 6 to 20 inches or more. Breaking up this compacted layer permits growing plants to extend their roots downwardly through the compacted layer into subsoil often having a substantially higher moisture content than the surface soil above the compacted layer.

Figure 1:
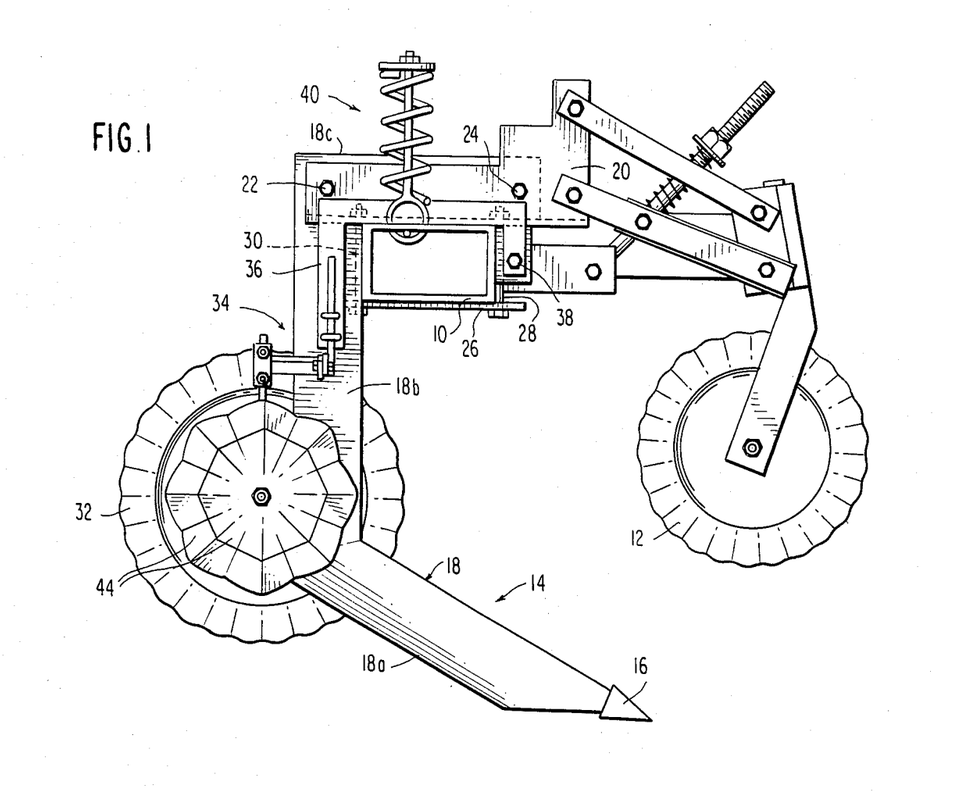
FIG. 1 is a side elevation of one row of the soil conditioning and seed bed preparation apparatus of this invention.

When used in conjunction with a leading trash-cutting assembly, the subsoiler 14 is preferably and advantageously mounted to the tool bar 10 behind and in substantial axial alignment with the front coulter 12. The subsoiler 14 comprises a point or blade portion 16 and a shank 18. Particularly in the deeper penetrating models, the distal end portion 18a of shank 18 may extend upwardly at an angle, preferably on the order of about 22–30 degrees. The blade portion 16 is integral with the distal end 18a. The proximal end portion of shank 18 includes an upwardly extending leg portion 18b and a horizontal portion 18c. The upper horizontal leg 18c of the L-shaped subsoiler shank is mounted to a first subsoiler assembly support member 20 by means of a shear bolt 22 and a pivot bolt 24. Support member 20 may be located on top of or in front of the tool bar 10; a second subsoiler support member 26 may be located below or behind tool bar 10. Support member 20 may consist of an angle member and support member 26 may comprise a flat plate with clamping bolts 28, 30 extending through the flanges of the angle member 20 and plate 26 on either side of the tool bar to clamp the support members to the tool bar.

The above described arrangement provides a secure support for the subsoiler 14. At the same time, the entire subsoiler assembly is laterally adjustable along the tool bar 10 by loosening bolts 28 and 30, moving support members 20 and 26 along the tool bar to the desired location, and retightening clamping bolts 28 and 30. The shear bolt 22 and pivot bolt 24 provide a breakaway mounting arrangement which permits the subsoiler 14 to pivot rearwardly and upwardly about bolt 24 in the event the blade 16 or shank 18 strikes an object, such as a large underground rock or tree stump.

Figure 2:
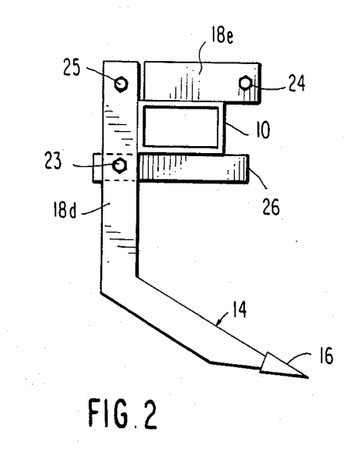
FIG. 2 shows a detail of an alternate subsoiler assembly mounting arrangement.

FIG. 2 shows an alternate mounting arrangement for the subsoiler 14. In this arrangement, the L-shaped portion of the subsoiler shank consists of a downwardly extending leg 18d and a separate horizontal leg 18e. The two legs are connected by a pivot support member 26. By this arrangement, when the subsoiler 14 hits a rock or tree stump with sufficent force to shear the bolt 23, shank portion 18d will pivot about bolt 25 until the end portion of shank part 18d strikes the end portion of shank part 18e, after which the entire assembly will pivot about bolt 24.

In normal operations, the point or blade portion 16 will wear 20 to 30 times faster than shank portion 18. An advantage of the FIG. 2 arrangement is that when the shank portion 18a of the subsoiler 14 wears out, it is only necessary then to replace that part and not shank portion 18e as well, resulting in a cost saving.

The slot filler assembly of this invention includes a slot filler wheel 32 which is mounted to the tool bar 10 to one side of the subsoiler 14, preferably and advantageously through an adjustable mounting assembly 34 described in more detail below. The mounting assembly includes a biasing mechanism generally designated 40 in FIG. 1; the downward force exerted by the bias means is preferably adjustable to control the depth of penetration of the slot filler wheel 32 into the soil beside the slot or groove formed by and behind subsoiler 14.

The slot filler wheel assembly of this invention differs significantly from conventional apparatus of the type described in the Brown et al '126 patent and Harden et al '916 patent. In such earlier apparatus, the slot filler wheel was mounted generally axially aligned with and behind the subsoiler assembly.

In this invention, the slot filler wheel 32 is located to one side of the subsoiler and preferably at least partly behind the subsoiler. That is, the slot filler wheel is located laterally of the subsoiler shank and the slot or groove formed by the subsoiler in its forward motion through the soil. In addition, the slot filler wheel is preferably disposed such that at least its rearmost part is located longitudinally rearwardly of the trailing edge of the subsoiler. Preferably and advantageously, slot filler wheel 32 is also tilted downwardly and angled inwardly toward the slot formed by the subsoiler 14.

It has been found that by mounting the filler wheel 32 to the side of the subsoiler, preferably, at least about 3 inches away from the subsoiler shank 18 and by tilting it downwardly, for example, on the order of about 3–7 degrees from the vertical, toward the bottom of the subsoiler, and angling it inwardly to the rear, for example, on the order of about 5–8 degrees, toward the slot formed by the subsoiler, the present invention does a better job of filling voids in the soil and closing the subsoil slot than known conventional apparatus. Moreover, by maintaining sufficient lateral spacing between the subsoiler and slot filler wheel, preferably on the order of at least about 3 inches, the amount of clogging of the apparatus with churned up soil and remaining trash which occurs is substantially reduced or eliminated entirely. It should be noted that the slot filler wheel could be located entirely rearwardly of the subsoiler (while maintaining the desired lateral spacing); this would result in a lengthening of the entire apparatus with some possible degradation of maneuverability of the unit.

The present inventor has found that the above described arrangement of the subsoiler 14 and slot filler wheel 32 has unique properties which produce substantial benefits in normal no-till planting operations. Specifically, it has been found that mounting the slot filler wheel 32 to the tool bar 10 independently with respect to the subsoiler 14 and biasing the slot filler wheel with a downward force (e.g., by means 40) results in increased depth penetration of the coulter 32 into the soil beside the slot formed by the subsoiler blade 16 and shank 18a, to a greater depth than similar types of conventional devices. This results in better and more uniform working of the soil and filling voids left by the subsoiler than could be achieved by known devices. Further and advantageously, such improved operation is achieved without requiring the addition of external weight, an addition required by known conventional devices.

One or more seed bed implements 44 are provided on the other side of the subsoiler shank 18 from the slot filler wheel 32. The seed bed implement 44 may be the same size as the slot filler wheel 32; but preferably implement 44 is not as large as the slot filler wheel 32 and prepares only the surface soil behind and laterally of the subsoiler. Slot filler wheel 32 and seed bed implement 44 are mounted for rotation about separate axes on either side of the subsoiler shank 18. The slot filler wheel and seed bed implement are preferably spaced about 4 to 16 inches apart.

The slot filler wheel 32 and seed bed implement(s) 44 may be mounted to the tool bar 10 by separate but similar adjustable mounting assemblies; FIG. 1 shows an assembly for mounting seed bed implement 44. In this embodiment, a flex arm 36 is mounted to the tool bar 10 for movement about a pivot axis 38. An adjustable spring assembly 40 bears against flex arm 36. A bias means, such as spring mechanism 40, exerts a downward force against flex arm 36 which translates into a downward pressure or force exerted by the seed bed implement 44 on the soil being worked. The bias means is adjustable to control the penetration depth of the seed bed implement 44 into the soil.

It has been found that, based on the use of a subsoiler capable of penetrating the soil to depths of at least 6 inches, the slot filler wheel should have a diameter greater than about 14 inches; in a preferred embodiment, the slot filler wheel has a diameter of about 22 inches.

The lateral positioning of the seed and root bed implements and various adjustments make it possible to prepare a level or raised seed bed so that a planter following the soil conditioning apparatus will plant level or on a raised seed bed; this is important, for example, in preventing crop injury from herbicides carried by water running into a seedbed that is in a trench or below ground level. Some types of no-till planters consistently prepare a seedbed that is below ground level, thereby allowing water from the row middles which may be carrying pesticides to run into the seedbed area. If this water is carrying pesticides it can cause crop stunting, pruning of roots and even crop death.

Under presently known no-till planting conditions, the soil warms up more slowly compared to plowed soil. By adjusting the seed and root bed implements to form and plant on a raised seedbed, the problem of slow soil warm-up is overcome because on a raised seedbed more soil surface is exposed to sunlight. Also the tillage accomplished by the seed and root bed implements allows more and better movement of air into the soil. This also aids in faster soil warm-up. Another advantage of a raised seedbed is that in wet soil types, the raised bed will dry out faster than the level area. This drier soil allows for earlier planting and in wetter conditions; the drier soil in the bed area won't drown out the young crop roots. This is critically important in wet soil types where early planting is desirable. There is also an advantage in harvesting of some crops that are planted on a bed; i.e., soybeans, peanuts, potatoes, etc.

A further feature of this invention which has been found highly advantageous comprises the use of additional soil preparation members, such as one or more coulters 42, or the like, extending laterally outwardly from the slot filler wheel 32. The soil preparation member 42 may be mounted to the slot filler wheel shaft for rotation with the slot filler wheel. More preferably, however, the slot filler wheel 32 and member 42 are mounted on separate shafts for independent motion. The different sizes of members 32 and 42 creates a shearing action between them which reduces or prevents clogging due to collected earth and/or mulch.

By the above described arrangement, the "row middles" (that is, the spacing between prepared rows), can be broken up and loosened to prepare a wider root bed. In this way, a good rooting environment is provided for the germinating plants both vertically through the compacted layer and laterally along and under the surface to take advantage of all available moisture and nutrients in the ground.

In one preferred embodiment, a slot filler wheel 32 and a secondary coulter 42 are mounted for rotation about one axis to one side of the subsoiler 14; a 17 inch seed bed implement and a 15 inch root bed implement 44 are mounted for rotation about a second axis on the other side of the subsoiler shank.

Figure 3:
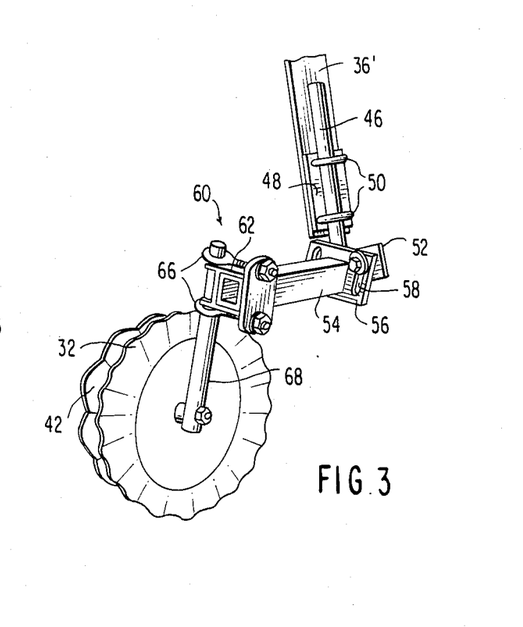
FIG. 3 shows a detail of the slot filler wheel and seed bed preparation implement mounting assembly.

In the above-described embodiment, the seed bed implement(s) 44 and slot filler wheel 32 are mounted to their respective flex arms 36 and 36' to permit substantially universal adjustment capability of the soil working implements. FIG. 3 shows one preferred mounting assembly for slot filler wheel 32, bearing in mind that the corresponding assembly for mounting seed bed implement 44 may be substantially the same.

The mounting assembly comprises a first, or main mounting shaft 46 which may be adjustably secured to a plate 48 by a pair of upper and lower U-bolts 50. Plate 48 is welded, or otherwise securely affixed to the bottom of shaft 46 and is preferably provided with a pair of holes or substantially vertical slots (not shown). The U-bolts 50 press the shaft against friction grips (not shown) welded to the plate 48 to provide a mounting arrangement whereby the shaft may be rotated about its long axis and thereafter securely fixed in the desired rotated position.

A square tubular member 54 has a generally rectangular plate 56 welded or otherwise securely affixed to one end. Plate 56 has a pair of slots 58 which match the holes or slots in plate 56. The tool bar 54 may be adjustably secured to the shaft 46 by conventional bolt and nut means which pass through the matching holes or slots in the plates 52 and 58. This arrangement permits the member 54 to rotate through an arc of about 90 degrees, or about 45 degrees to the left and right of the center. A slidably adjustable mounting assembly 60 is provided for mounting the soil conditioning implements to the member 54. In one embodiment, this mounting assembly comprises an H-shaped member 62, an end plate 64 and a pair of eye bolts 66. The eye bolts 66 are located on each side of the H-member and pass through openings in the plate 64. A second, or implement mounting shaft 68 passes through the eyes of bolts 66 and rests in part circular cutouts in the legs of H-shaped member 62. When the nuts on the ends of the eye bolts 66 are loosened, the entire mounting assembly 60 is adjustable axially along member 54 and shaft 68 is adjustable axially and rotationally about its longitudinal axis (substantially perpendicular to the longitudinal axis of member 54). Tightening the nuts on bolts 66 secures the mounting assembly 60 in its desired position on member 54 and secures the shaft against further rotation or axial movement.

Figure 4:
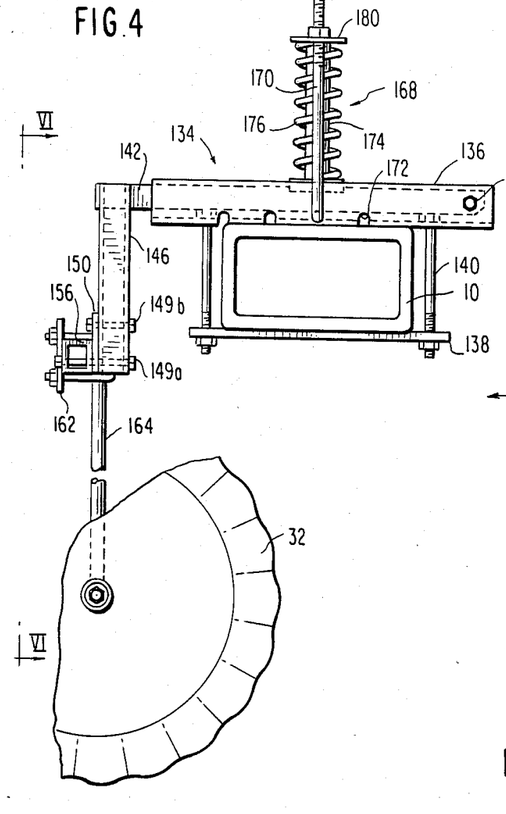
FIG. 4 is a side elevation of a further embodiment of the slot filler mounting assembly.
Figure 5:
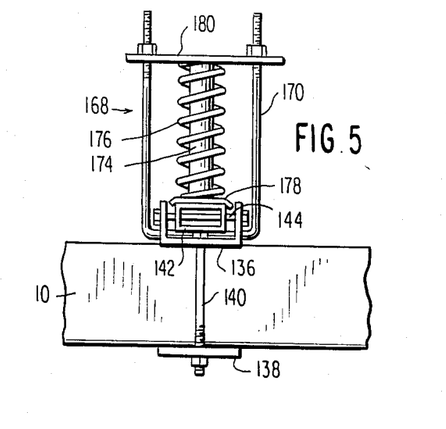
FIG. 5 is an end view taken along lines V—V in FIG. 4.
Figure 6:
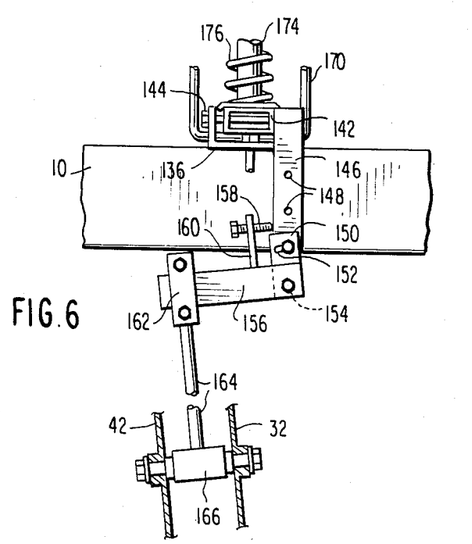
FIG. 6 is an end view taken along the lines VI—VI in FIG. 4.

FIGS. 4-6 show a second embodiment of the slot filler mounting assembly, incorporating features which have been found to be particularly advantageous and which show marked improvement in conditioning the soil as compared to other arrangements. The slot filler mounting assembly 134 includes a channel member 136 which may be welded to the tool bar 10; alternatively, channel member 136 may be clamped by means of a bottom clamp member 138 extending across the bottom of the tool bar 10 and clamping bolts 140 connecting members 136 and 138 on opposite sides of the tool bar 10. A slot filler pivot arm member 142 is pivotably secured to channel member 136 by means of a pivot bolt 144 mounting one end of pivot arm member 142 to one end of channel member 136.

A slot filler pivot arm extension member 146 extends downwardly from the opposite end of pivot arm 142. Extension member 146 contains a plurality of mounting holes 148 for receiving mounting bolts 149 which mount a slot filler bracket member 150 to the extension member 146. At least two mounting holes 148 are provided in extension member 146, although (as shown in FIG. 6) three, four or more holes may be provided to permit height adjustment of the slot filler wheel and its immediate mounting assembly. The slot filler bracket member 150 contains a pair of openings 152, 154, aligned with openings 148 in the extension member 146. The upper opening 152 is slot shaped to permit bracket 150 to pivot about a pivot axis defined by a lower mounting bolt 149a passing through lower bracket member opening 154 and the corresponding extension member opening 148. An upper mounting bolt 149b may be tightened to secure bracket 150 in position.

A laterally extending square tubular member 156 is welded or otherwise secured to bracket member 150. A mounting plate 162 mounts a bearing housing shaft 164 to member 156 with eyebolts (not shown), essentially as shown in FIG. 3. Shaft 164 in turn mounts at its lower end a bearing housing 166. Preferably and advantageously, in this embodiment, the slot filler wheel 32 and root bed preparation member 42 are mounted to bearing housing 166 for separate and independent rotation about substantially parallel axes of rotation. This is advantageous in that the different diameter members rotate at different speeds, thereby creating a shearing action between them to reduce or prevent clogging.

FIG. 6 shows a single bearing housing 166 mounting the slot filler wheel 32 and the root bed preparation member 42. An alternative arrangement (not shown) which has been found to have some advantages over the arrangement shown, but at substantial manufacturing cost increase, involves mounting separate bearings housings on the bottom of shaft 164, with slot filler wheel 32 being rotatably mounted to the forward bearing housing and root bed preparation member 42 being rotatably mounted to the rear bearing housing.

An advantage of this arrangement is that the centers of the coulters are offset, whereby they are less likely to become clogged with trash and soil.

A set screw 158 is threaded through a set screw mounting arm 160 welded or otherwise securely fastened to member 156. After the desired tilt of slot filler wheel 32 is set by adjustment of bracket 150 about pivot bolt 149a, set screw 158 is tightened against member 146 to maintain the preset tilt of slot filler wheel 32 against the upwardly directed forces acting on slot filler wheel 32 as it works the soil in and around the slot formed by subsoiler 14.

An adjustable spring bias mechanism 168 is provided to impart a desired adjustable downward force on the slot filler wheel 32. In the embodiment shown in FIGS. 4-6, the spring bias mechanism 168 comprises a U-shaped bolt 170 which passes through one of a plurality of force setting locater notches 170 formed in channel member 136 and extending upwardly on either side thereof. A spring support columnar member 174 supports a bias spring 176 between a bottom plate 178, which rests on the top face of pivot arm member 142, and a top plate 180 containing bolt holes through which pass the threaded arms of U-shaped bolt 170. The biasing force exerted on pivot arm member 142 is adjustable as a function of the placement of U bolt 170 through a particular notch 172. The biasing force increases as a direct function of the distance of the locater notch 172 from pivot axis 144. In addition, the biasing force is adjustable as a function of the degree to which top plate 180 is tightened down on the threaded arms of U bolt 170.

Figure 7:
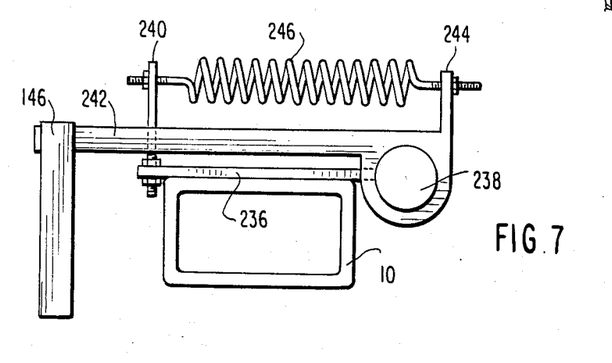
FIG. 7 shows a side elevation of a still further slot filter mounting assembly.

A still further slot filler mounting assembly arrangement is shown in FIG. 7. In this arrangement, a generally flat base member 236 is welded or otherwise secured to tool bar 10; alternative mounting arrangements include clamping, such as shown with respect to the embodiment of FIGS. 4-6. The base member 236 has a large diameter shaft portion 238 formed on one end and a stationary spring mount member 240 secured on the other end. A slot filler pivot arm member 242 is fitted over shaft portion 238 at one end to pivot about the shaft formed thereby. A movable spring support arm 244 is formed on or fixed to the end portion of pivot arm member 242 mounted to shaft portion 238. A spring 246 is secured between the stationary spring mount 240 and movable spring mount 244 to exert a predetermined tension on the pivot arm 242. In essentially all other respects, the mounting of slot filler wheel 32 to the pivot arm member 242 in FIG. 7 may be substantially the same as shown in the embodiment of FIGS. 4-6.

The above described invention overcomes long standing farming problems and provides an apparatus which combines the advantages of both conventional and no-till farming. For example, it is known that in order to obtain satisfactory planting, it is necessary to close the slot formed behind a subsoiler to keep the seed and young plants from caving in after a heavy rain. This is accomplished in the present invention by the novel arrangement of the slot filler wheel and seed bed implements in relation to the subsoiler and to each other.

Locating the slot filler wheel and seed bed implements to respective sides of and slightly behind the subsoiler shank permits level or raised bed planting, which is important for the optimum growth and harvesting of some crops, such as soybeans. This arrangement also results in a better closing of the subsoiler-formed slot than was obtainable with prior devices. Additionally, the length of the apparatus is reduced by up to about two feet compared to known conventional devices.

In summary, the soil conditioning apparatus of the present invention prepares a better medium for root growth than conventional farming. This is done under no-till conditions, leaving the mulch (or trash), with all its advantages, such as (1) less water erosion, (2) less wind erosion, (3) better water absorption, (4) less weed germination, (5) less machinery required, (6) less fuel used (all operations being performed on one pass), (7) less stream pollution, and (8) less labor required.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed is:

1. Soil conditioning apparatus, comprising:

a main frame;

soil loosening means coupled to the main frame for cutting and loosening compacted soil, the soil loosening means including subsoiler means coupled to the main frame and extending downwardly to be pulled into the earth below the surface to form a slot or groove in the soil into which roots may grow;

soil preparation means coupled to the main frame for working the soil adjacent to and into the slot left by the forward motion of the subsoiler means therethrough, the soil preparation means including independently rotatable substantially solid surface disk-shaped members;

respective pivot arm means mounting said rotatable members to said frame on laterally opposite sides of and in at least partially overlapping relation with the subsoiler means and laterally spaced from the slot or groove formed by the subsoiler means for movement independently of the subsoiler means in respective substantially vertical planes relative to the soil surface; and biasing means coupled with said pivot arm means for urging said rotatable members downwardly into the soil adjacent the subsoiler means independently of the depth of penetration of the subsoiler into the soil to push soil loosened by the subsoiler means back into the slot or groove formed by the subsoiler means to substantially fill the voids formed in the slot or groove and to substantially close the slot or groove behind the subsoiler means substantially to the depth of the slot or groove.

2. Apparatus according to claim 1, further comprising: means coupled to the main frame for cutting surface trash along a relatively narrow track ahead of and substantially aligned with the path of travel of said soil conditioning means.

3. Apparatus according to claim 1, wherein said rotatable members comprise fluted coulters.

4. Apparatus according to claim 1, further comprising means mounting the rotatable members to lie in respective planes of rotation which extend downwardly at an angle to the vertical toward the subsoiler and inwardly toward the slot formed behind the subsoiler.

5. Apparatus according to claim 1, wherein the rotatable members are substantially disk shaped.

6. Apparatus according to claim 1, further comprising means for mounting the rotatable members to lie in respective planes of rotation which extend downwardly at an angle to the vertical toward the subsoiler means and inwardly toward the slot formed behind the subsoiler means.

7. Apparatus according to claim 6, further comprising: means for mounting the rotatable members to the main frame such that the rotatable members lie substantially in respective planes of rotation angled inwardly toward the slot or groove formed by the subsoiler at an angle in the range of about 5-8 degrees and tilted from the vertical at an angle in the range of about 3-7 degrees toward the portion of the subsoiler means adapted to penetrate the soil.

8. Apparatus according to claim 1, further comprising additional soil preparation members mounted for rotation separately from the rotatable members on the same side of the path of travel of the subsoiler means and spaced laterally outwardly of the innermost rotatable members relative to the subsoiler path of travel.

9. Apparatus according to claim 1, further comprising means for adjusting the bias forces exerted by the biasing means against the pivot arms to thereby permit adjustment of the soil penetration force acting on the rotatable members.

10. Apparatus according to claim 9, further comprising additional soil preparation members mounted to the pivot arms for rotation separately from the rotatable members on the same side of the path of travel of the subsoiler and spaced laterally outwardly of the innermost rotatable members relative to the subsoiler path of travel.

11. Apparatus for conditioning soil, comprising:
a main frame;
means coupled to the main frame for cutting surface trash along a relatively narrow track;
soil conditioning means for conditioning soil behind the trash cutting means, including a subsoiler having a blade portion and a shank portion, and means for securing the shank portion of the subsoiler to the main frame such that the subsoiler extends downwardly from the main frame behind the trash cutting means to form a slot or groove in the soil beneath the surface of the ground;
soil preparation means, including first and second substantially disk-shaped members, adjustable mounting means for adjustably mounting the disk-shaped members to the main frame on each side of and partly behind the subsoiler and laterally spaced from and in longitudinally overlapping relationship with the subsoiler so that a portion of each disk-shaped member extends forwardly of the trailing face of the subsoiler, one of the disk-shaped members having a diameter no greater than the diameter of the other of the disk-shaped members, and means biasing the disk-shaped members downwardly, such that, during operation of the apparatus, the disk-shaped members are adapted to be pulled downwardly into the soil adjacent the subsoiler independently of the depth of penetration of the subsoiler into the soil to push soil loosened by the subsoiler back into the slot or groove formed thereby to substantially fill the voids formed in the slot or groove and to substantially close the slot or groove behind the subsoiler to substantially the depth of penetration of the rotatable member; and
means mounting the rotatable members to lie in respective planes of rotation which extend downwardly at an angle to the vertical toward the subsoiler and inwardly toward the slot formed behind the subsoiler.

12. Apparatus for conditioning soil, comprising:
a main frame;
means coupled to the main frame for cutting surface trash along a relatively narrow track;
soil conditioning means for conditioning soil behind the trash cutting means, including a subsoiler having a blade portion and a shank portion, and means for securing the shank portion of the subsoiler to the main frame such that the subsoiler extends downwardly from the main frame behind the trash cutting means to form a slot or groove in the soil beneath the surface of the ground;
soil preparation means, including first and second substantially disk-shaped members, adjustable mounting means for adjustably mounting the disk-shaped members to the main frame on each side of and partly behind the subsoiler and laterally spaced from and in longitudinally overlapping relationship with the subsoiler so that a portion of each disk-shaped member extends forwardly of the trailing face of the subsoiler, one of the disk-shaped members having a diameter no greater than the diameter of the other of the disk-shaped members, and means biasing the disk-shaped members downwardly, such that, during operation of the apparatus, the disk-shaped members are adapted to be pulled downwardly into the soil adjacent the subsoiler independently of the depth of penetration of the subsoiler into the soil to push soil loosened by the subsoiler back into the slot or groove formed thereby to substantially fill the voids formed in the slot or groove and to substantially close the slot or groove behind the subsoiler to substantially the depth of penetration of the rotatable member; and
additional soil preparation members mounted for rotation separately from the rotatable members on the same side of the path of travel of the subsoiler and spaced laterally outwardly of the innermost rotatable members relative to the subsoiler path of travel.

13. Apparatus for conditioning soil, comprising:
a main frame;
means coupled to the main frame for cutting surface trash along a relatively narrow track;
soil conditioning means for conditioning soil behind the trash cutting means, including a subsoiler having a blade portion and a shank portion, and means for securing the shank portion of the subsoiler to the main frame such that the subsoiler extends downwardly from the main frame behind the trash cutting means to form a slot or groove in the soil beneath the surface of the ground;
soil preparation means, including first and second substantially disk-shaped members, adjustable mounting means for adjustably mounting the disk-shaped members to the main frame on each side of and partly behind the subsoiler and laterally spaced from and in longitudinally overlapping relationship with the subsoiler so that a portion of each disk-shaped member extends forwardly of the trailing face of the subsoiler, one of the disk-shaped members having a diameter no greater than the diameter of the other of the disk-shaped members, and means biasing the disk-shaped members downwardly, such that, during operation of the apparatus, the disk-shaped members are adapted to be pulled downwardly into the soil adjacent the subsoiler independently of the depth of penetration of the subsoiler into the soil to push soil loosened by the subsoiler back into the slot or groove formed thereby to substantially fill the voids formed in the slot or groove and to substantially close the slot or groove behind the subsoiler to substantially the depth of penetration of the rotatable member;

means for mounting the rotatable members to respective pivot arms; and means for pivotably mounting the pivot arms to the main frame to permit pivotal movement of the arms in a substantially vertical plane relative to he plane of the soil surface;

the biasing means being coupled with the pivot arms to exert biasing forces thereagainst.

14. Apparatus according to claim 13, further comprising means for adjusting the bias forces exerted by the biasing means against the pivot arms to thereby permit adjustment of the soil penetration force acting on said rotatable members.

15. Soil conditioning apparatus, comprising:

a main frame;

soil loosening means coupled to the main frame for cutting and loosening compacted soil, the soil loosening means including subsoiler means coupled to the main frame and extending downwardly to be pulled into the earth below the surface to form a slot or groove in the soil into which roots may grow;

soil preparation means coupled to the main frame for working the soil adjacent to and into the slot left by the forward motion of the subsoiler means therethrough, the soil preparation means including independently rotatable members, each comprising a fluted coulter having a substantially solid disk-shaped surface;

pivot arm means mounting said rotatable members to said frame on laterally opposite sides of the subsoiler means and laterally spaced from the slot or groove formed by the subsoiler means for movement independently of the subsoiler means in respective substantially vertical planes relative to the soil surface; and biasing means coupled with said pivot arm means for urging said rotatable members downwardly into the soil adjacent the subsoiler means independently of the depth of penetration of the subsoiler into the soil to push soil loosened by the subsoiler means back into the slot or groove formed by the subsoiler means to substantially fill the voids formed in the slot or groove and to substantially close the slot or groove behind the subsoiler means substantially to the depth of the slot or groove.

16. Apparatus according to claim 15, wherein said pivot arm means comprises separate pivot arms respectively mounting said rotatable members for independent movement on laterally opposite sides of said subsoiler means, said biasing means being coupled with each of said pivot arms.

17. In an apparatus having a main frame and means coupled to the main frame for cutting surface trash along a relatively narrow track, improved soil conditioning means for conditioning soil behind said trash cutting means, comprising:

a subsoiler having a blade portion and a shank portion, and means for securing the shank portion of the subsoiler to the main frame such that the subsoiler extends downwardly from the main frame behind said loosening means to form a slot or groove in the soil beneath the surface of the ground;

a slot filler assembly including: a slot filler wheel, comprising a fluted coulter having a diameter of at least about 17 inches, adjustable mounting means for adjustably mounting the slot filler wheel to the main frame adjacent to and laterally spaced from said subsoiler, said slot filler wheel being mounted to lie in a plane of rotation which extends downwardly toward said subsoiler and inwardly toward the slot formed behind the subsoiler, a slot filler support arm coupled to said main frame for pivotal movement relative thereto, and means adjustably mounting the slot filler wheel to the slot filler support arm; and root bed preparation means including at least one rotatable root bed implement having a diameter no greater than that of said slot filler wheel and mounted for rotation on the same side of the path of travel of the subsoiler as said slot filler wheel.

* * * * *